June 1, 1965  A. H. FILANDER  3,186,878
QUICK RELEASE LATCHING MEANS FOR SEPARABLE CASE
ADAPTED TO BE TELESCOPED WITHIN A HOUSING
Filed March 5, 1962
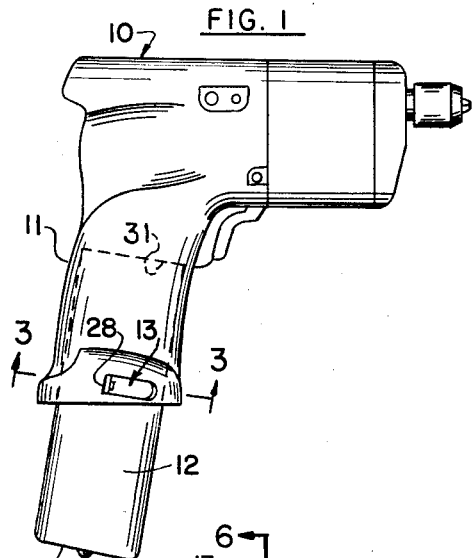
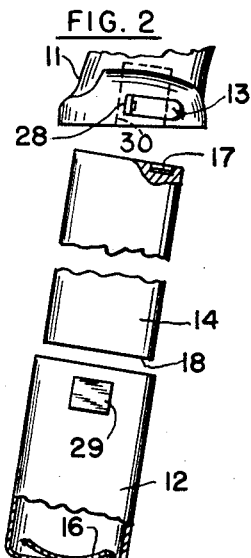
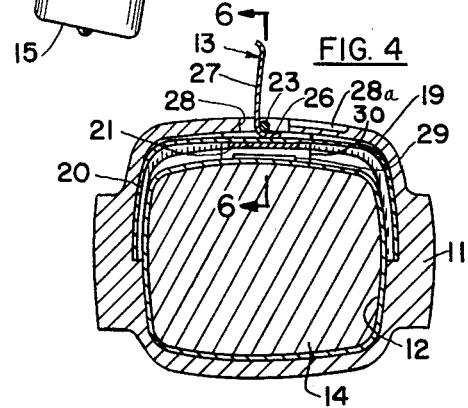
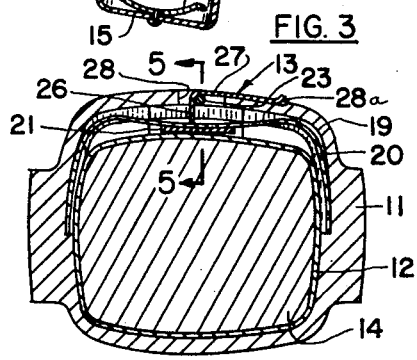
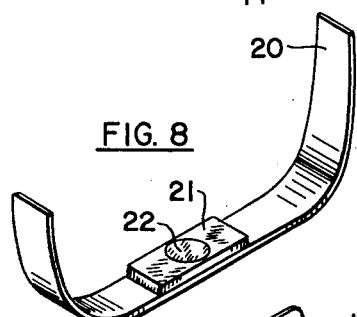
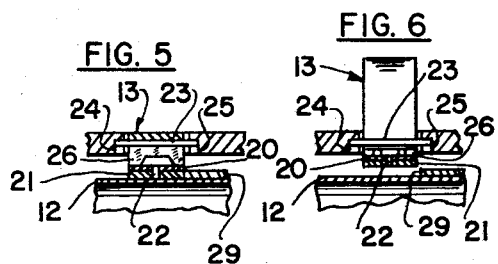
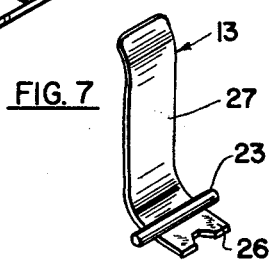
INVENTOR
ARTHUR H. FILANDER
BY  *Leonard Bloom*
ATTORNEY United States Patent Office 3,186,878
Patented June 1, 1965

3,186,878
QUICK RELEASE LATCHING MEANS FOR SEPARABLE CASE ADAPTED TO BE TELESCOPED WITHIN A HOUSING
Arthur H. Filander, Baltimore, Md., assignor to The Black and Decker Manufacturing Company, Towson, Md., a corporation of Maryland
Filed Mar. 5, 1962, Ser. No. 177,450
4 Claims. (Cl. 136—173)

The present invention relates to a quick release latching means for a separable case adapted to be telescoped within a housing, such as a detachable battery case of a cordless electric device, and more particularly, to such latching means as would be suitable for use in conjunction with a co-pending Butler application, Ser. No. 177,457, filed March 5, 1962, entitled "Housing Means for Slide-Out Battery of Cordless Electric Device," and assigned to the assignee of the present invention.

In the aforementioned Butler application, a cordless electric device is illustrated, wherein a slide-out battery pack is housed partially within a hollow handle housing of the device and partially within a separable battery case that is detachably secured to the housing and extends therefrom. The battery case is adapted to have a keyed sliding movement with respect to the housing and to be partially telescoped within the housing, such that the die-cast housing is made universal for a variety of battery pack lengths; and only the relatively-inexpensive battery case need be replaced. It is with such apparatus that the present invention, while not necessarily confined thereto, may nevertheless find more particular utility.

Accordingly, it is an object of the present invention to provide latching means operable between a hollow housing and a separable case which is to be telescoped at least partially within the housing.

It is another object of the present invention to provide a quick release latching means that may be easily manipulated for rapid removal of the battery case from the housing, thereby allowing a discharged battery to be rapidly removed and replaced with a recharged battery.

It is yet still another object of the present invention to provide a quick release latching means that is positive in its operation and maintains a firm connection between the battery case and the housing.

It is a further object of the present invention to provide a latching means that is simple and reliable and may be manufactured economically from readily-available materials.

In accordance with the teachings of the present invention, there is provided within the housing a latch member which has a radial movement inwardly and outwardly of the housing. The latch member is urged radially outwardly with respect to the housing by suitable resilient means; and a pivoted cam lever causes the latch member to be cammed inwardly of the housing against the action of the resilient means. The lever has a portion which extends through the housing, such that the lever is externally accessible for a manual manipulation. The lever has a locking position and an unlocking position with respect to the housing, and means are formed on the separable battery case to cooperate with the latch member to prevent the battery case from being withdrawn from the housing whenever the lever is in its locking position.

These and other objects of the present invention will become apparent from a reading of the following specification, taken in conjunction with the enclosed drawings, in which:

FIGURE 1 is a side elevational view of a typical cordless electric device having a separable battery case detachably secured to the hollow housing of the device and extending therefrom;

FIGURE 2 is an exploded view showing a portion of the housing, the battery case removed from the housing, and the slide-out battery pack which is ordinarily housed mutually between the hollow housing and the separable battery case;

FIGURE 3 is a sectional view taken along the lines 3—3 of FIGURE 1, showing the latching means of the present invention in the locking position;

FIGURE 4 is a sectional view, corresponding to a portion of FIGURE 3, but showing the latching means in the unlocking position;

FIGURE 5 is a sectional view taken along the lines 5—5 of FIGURE 3;

FIGURE 6 is a sectional view taken along the lines 6—6 of FIGURE 4;

FIGURE 7 is a perspective view of the cam lever of the present invention; and

FIGURE 8 is a perspective view of the spring latch and latch member of the present invention.

With reference to FIGURES 1 and 2, there is illustrated a cordless electric drill 10 with which the teachings of the present invention may find more particular utility, although it will be appreciated that the present invention is equally applicable to a wide variety of cordless electric devices. The drill 10 includes a substantially-hollow housing 11, preferably formed as a pistol-grip handle as shown, within which a separable battery case 12 is to be slidably inserted. The battery case 12 is partially telescoped within the housing 11 and is retained therein by the latching means of the present invention, which includes a pivoted cam lever 13. A slide-out battery pack 14 is housed mutually between the housing 11 and the battery case 12; and preferably, but not necessarily, the battery pack 14 comprises a series of rechargeable energy cells of the nickel-cadmium or silver-cadmium type. Moreover, the battery case 12 has a closed bottom end 15 to which a leaf spring 16 is secured; and the bottom portion 18 of the battery pack 14 rests upon the spring 16, thus making the battery pack spring-loaded to insure good electrical contact and firm mechanical rigidity. The top of the battery pack 14 has a pair of contacts, one of which is shown as at 17, to energize the drill 10 in a manner known to one skilled in the art.

With reference to FIGURES 3-6, the latching means of the present invention may be more clearly appreciated. An internal recess 19 is formed within the housing 11 along an axis which is substantially transverse to the longitudinal axis of the handle, and a spring latch 20 is received within the recess 19. The spring latch 20 has a latch member 21 secured thereto as by a rivet 22. The assembly of the spring latch 20 and the latch member 21 is shown in perspective view in FIGURE 8. The cam lever 13, which is shown in perspective view in FIGURE 7, has a transverse pin 23 secured thereto by a simple brazing operation or other means. The pin 23 has respective end portions received in a pair of aligned recesses 24 and 25. The recesses 24 and 25 are formed within the housing 11 along an axis transverse to the internal recess 19 and in communication therewith. Moreover, the cam lever 13 has a toe portion 26 and a lever portion 27, with the pin 23 being intermediate these portions. The lever portion 27 extends through a window 28 formed in the housing 11 and is received within a recess 28a formed in the housing 11 adjacent to the window 28. The lever portion 27 thus is substantially flush with the surface of the handle 11, and the lever portion 27 has an upturned end to accommodate a manual manipulation by the user. Furthermore, the battery case 12 has a raised key portion 29 which cooperates with a keyway 30 formed in the housing 11 to properly orientate the inward sliding movement of the battery case 12 with respect to the housing 11, while a shoulder 31 is formed internally of the housing 11 to limit the inward sliding movement of the battery case 12.

The operation of the present invention is as follows: The cam lever 13 is pivoted and has a raised unlocking position and a depressed locking position with respect to the housing 11. In the locking position, the toe portion 26 of the cam lever 13 engages the spring latch 20 and depresses it radially inwardly of the housing 11, thus depressing the latch member 21 which is secured to the spring latch 20. Thereafter, the latch member 21 cooperates with the raised key portion 29 of the battery case 12 to preclude the battery case 12 from being withdrawn from the housing 11. In the raised or unlocking position of the cam lever 13, the toe portion 26 thereof is taken out of effective engagement with the back of the spring latch 20, such that the spring latch 20 expands radially within the internal recess 19. Consequently, the latch member 21 is raised or lifted out of engagement with the raised key portion 29 on the battery case 12, thus allowing the battery case 12 to be slidably removed from the housing 11.

Obviously, many modifications may be made without departing from the basic spirit of the present invention; and accordingly, within the scope of the appended claims, the invention may be practiced other than has been specifically described.

I claim:

1. For use in conjunction with a cordless electric device of the type having a housing and further having a separable battery case adapted for keyed sliding movement with respect to the housing and to be partially telescoped within the housing, a quick release latching means operable between the housing and the battery case, which comprises:
   (a) a partially-completed internal generally-annular recess formed within the housing and terminating in a pair of end portions, one on each side of the housing;
   (b) the housing having a substantially longitudinal axis, and said recess being transverse to said axis;
   (c) a spring latch comprising a leaf spring received within said recess, the ends of said leaf spring resting on the respective end portions of said recess, whereby said spring exerts a radial outward force against said recess, so as to be retained within the housing;
   (d) a latch member secured to said spring latch and depending therefrom inwardly of the housing;
   (e) a window formed within the housing;
   (f) a manually-manipulatable cam lever pivotably supported by the housing adjacent said window and having a portion extending through said window and engaging said spring latch on the side of said spring latch which is opposite from said latch member;
   (g) said cam lever having a raised unlocking position and a depressed locking position with respect to said housing, whereby in the depressed locking position, said cam lever engages said leaf spring and moves said spring and said latch member radially inwardly of the housing against the tension of said spring; and
   (h) a raised portion formed on the battery case and having an edge which cooperates with said latch member to prevent the battery case from being withdrawn from the housing whenever said cam lever is in its depressed position.

2. Quick release latching means as defined in claim 1, wherein said pivoted cam lever comprises:
   (a) a toe portion engaging said spring latch to cam said latch member radially inwardly of the housing;
   (b) an integral lever portion extending through said window and accessible for a manual manipulation by the user; and
   (c) a transverse pivot pin secured to said cam lever intermediate said toe portion and said lever portion thereof.

3. Quick release latching means as defined in claim 2, wherein:
   (a) said housing has a pair of aligned recesses formed therein along an axis which is transverse to said recess for said spring latch and in communication with said recess; and wherein:
   (b) said transverse pivot pin of said cam lever has respective end portions projecting beyond said cam lever, whereby said respective end portions are received within said aligned recesses in said housing.

4. In combination with a housing and a separable case adapted to be telescoped at least partially within the housing, quick-release latching means between the housing and the separable case, said latching means comprising:
   (a) an internal generally flat-bottomed recess formed within the housing, substantially transverse to the longitudinal axis of the housing, and communicating with the interior of the housing;
   (b) a leaf spring seated within said recess and exerting an outward radial force against the bottom of said recess;
   (c) a latch member carried by the central portion of said leaf spring and extending therefrom radially inwardly of the housing;
   (d) manually-manipulatable means carried by the housing to advance said leaf spring and said latch member radially inwardly of the housing; and
   (e) means carried by said separable case and having a portion engaging said latch member to retain said case to said housing in the advanced position of said leaf spring.

References Cited by the Examiner

UNITED STATES PATENTS

| | | | |
|---|---|---|---|
| 1,187,888 | 6/16 | Diehm | 89—195 |
| 1,676,945 | 7/28 | Ellis | 136—173 |
| 1,995,141 | 3/35 | Barber et al. | |
| 2,137,230 | 11/38 | Arden | 240—10.66 |
| 2,468,784 | 5/49 | Seagraves | 89—195 |

JOHN H. MACK, *Primary Examiner.*